United States Patent
Suciu et al.

(10) Patent No.: US 9,470,153 B2
(45) Date of Patent: *Oct. 18, 2016

(54) COMBINED PUMP SYSTEM FOR ENGINE TMS AOC REDUCTION AND ECS LOSS ELIMINATION

(75) Inventors: Gabriel L. Suciu, Glastonbury, CT (US); Jorn A. Glahn, Manchester, CT (US); Brian D. Merry, Andover, CT (US); Christopher M. Dye, San Diego, CA (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 1038 days.

This patent is subject to a terminal disclaimer.

(21) Appl. No.: 13/253,144

(22) Filed: Oct. 5, 2011

(65) Prior Publication Data

US 2013/0086922 A1    Apr. 11, 2013

(51) Int. Cl.

| F02C 7/32 | (2006.01) |
|---|---|
| F02C 7/14 | (2006.01) |
| F02C 3/09 | (2006.01) |
| F02C 9/16 | (2006.01) |
| F02C 3/10 | (2006.01) |
| F02C 7/36 | (2006.01) |
| F02C 3/107 | (2006.01) |
| F02C 6/04 | (2006.01) |

(52) U.S. Cl.
CPC . *F02C 7/32* (2013.01); *F02C 7/14* (2013.01); *F02C 3/09* (2013.01); *F02C 3/103* (2013.01); *F02C 3/107* (2013.01); *F02C 6/04* (2013.01); *F02C 7/36* (2013.01); *F02C 9/16* (2013.01); *Y02T 50/675* (2013.01)

(58) Field of Classification Search
CPC .............. F02C 7/14; F02C 3/09; F02C 3/10; F02C 9/16; F02C 6/04; F02C 6/08; F02C 3/103; F02C 3/107; F02C 7/36
USPC ...................... 60/792, 226.1, 262, 39.08, 266
See application file for complete search history.

(56) References Cited

U.S. PATENT DOCUMENTS

| 3,390,527 | A | * | 7/1968 | Decher et al. ............... 60/226.1 |
| RE31,835 | E |   | 2/1985 | Rannenberg |
| 4,722,666 | A | * | 2/1988 | Dennison .............. A61M 1/101 416/174 |
| 4,934,140 | A | * | 6/1990 | Dennison .................. F02C 7/20 244/54 |
| 5,125,597 | A | * | 6/1992 | Coffinberry ............. B64C 21/00 244/118.5 |
| 5,357,742 | A | * | 10/1994 | Miller .................... B64D 33/08 244/53 B |
| 5,511,374 | A |   | 4/1996 | Glickstein et al. |
| 5,595,474 | A | * | 1/1997 | Girard ..................... B64C 11/44 416/1 |
| 5,722,229 | A | * | 3/1998 | Provost .................. B64D 13/06 60/728 |

(Continued)

*Primary Examiner* — Gerald L Sung
*Assistant Examiner* — Eric Linderman
(74) *Attorney, Agent, or Firm* — Cantor Colburn LLP

(57) ABSTRACT

A compression pump for an engine is provided. The pump may include a first pump impeller operatively coupled to a main shaft of the engine, a first inlet configured to at least partially receive bypass airflow, and a first outlet configured to direct compressed air to a thermal management system. The first pump impeller may be rotatably fixed about a common axis of the compression pump. Additionally the compression pump may extend radially to one exterior side of the engine. Furthermore the compression pump can be coupled to the main shaft of the engine by an engine towershaft. A first intake manifold may be coupled to a first inlet of the compression pump and a first discharge manifold may be couple to a first outlet of the compression pump which may have one or more heat exchangers.

20 Claims, 4 Drawing Sheets

(56) References Cited

U.S. PATENT DOCUMENTS

| | | | | |
|---|---|---|---|---|
| 5,894,721 A * | 4/1999 | Hanson | | F01D 5/145 181/222 |
| 6,202,403 B1 * | 3/2001 | Laborie | | B64D 33/08 60/39.83 |
| 6,250,061 B1 | 6/2001 | Orlando | | |
| 6,629,428 B1 * | 10/2003 | Murry | | B64D 13/06 62/401 |
| 7,055,330 B2 * | 6/2006 | Miller | | F02C 7/32 60/792 |
| 7,231,767 B2 | 6/2007 | Whiting | | |
| 7,444,802 B2 * | 11/2008 | Parry | | F01D 5/10 415/160 |
| 7,578,136 B2 | 8/2009 | Derouineau et al. | | |
| 7,624,565 B2 * | 12/2009 | Murrow | | F01C 1/107 60/39.45 |
| 7,797,962 B2 | 9/2010 | Kresser et al. | | |
| 7,856,824 B2 * | 12/2010 | Anderson | | B64D 13/08 60/226.1 |
| 8,397,487 B2 * | 3/2013 | Sennoun | | B64D 13/06 60/266 |
| 8,814,502 B2 * | 8/2014 | Eleftheriou | | F02C 7/32 415/122.1 |
| 2005/0268612 A1 * | 12/2005 | Rolt | | B64D 33/08 60/728 |
| 2006/0117734 A1 * | 6/2006 | Larkin | | F01D 25/12 60/226.1 |
| 2006/0260323 A1 * | 11/2006 | Moulebhar | | F01D 21/0003 60/793 |
| 2006/0272313 A1 * | 12/2006 | Eick | | F02C 3/107 60/39.63 |
| 2007/0245738 A1 * | 10/2007 | Stretton | | F02C 7/141 60/728 |
| 2007/0277500 A1 * | 12/2007 | Jones | | F02C 5/02 60/204 |
| 2008/0273976 A1 * | 11/2008 | Suciu | | F01D 5/148 416/46 |
| 2009/0049841 A1 * | 2/2009 | Pierrot | | F02C 7/32 60/784 |
| 2009/0139243 A1 * | 6/2009 | Winter | | F02C 7/32 60/802 |
| 2009/0188234 A1 * | 7/2009 | Suciu et al. | | 60/262 |
| 2009/0205341 A1 * | 8/2009 | Muldoon | | F02C 7/32 60/792 |
| 2009/0208328 A1 * | 8/2009 | Stern | | F02K 1/002 415/145 |
| 2010/0024434 A1 * | 2/2010 | Moore | | F02C 7/32 60/788 |
| 2010/0061839 A1 * | 3/2010 | Bartolomeo | | F02C 7/32 415/122.1 |
| 2010/0107650 A1 * | 5/2010 | Ress, Jr. | | F02C 7/32 60/784 |
| 2011/0131999 A1 * | 6/2011 | Gao | | B64D 13/06 60/782 |
| 2013/0086922 A1 * | 4/2013 | Suciu | | F02C 7/14 60/802 |
| 2013/0098046 A1 * | 4/2013 | Suciu et al. | | 60/772 |
| 2013/0098047 A1 * | 4/2013 | Suciu et al. | | 60/772 |
| 2013/0187007 A1 * | 7/2013 | Mackin | | F02C 6/08 244/134 R |
| 2013/0239582 A1 * | 9/2013 | Suciu | | F01D 15/08 60/785 |
| 2013/0239583 A1 * | 9/2013 | Suciu et al. | | 60/785 |
| 2013/0239584 A1 * | 9/2013 | Suciu | | F01D 15/08 60/792 |
| 2013/0239588 A1 * | 9/2013 | Suciu | | F02C 7/14 60/806 |
| 2014/0250898 A1 * | 9/2014 | Mackin | | F02C 6/08 60/772 |

* cited by examiner

COMBINED PUMP SYSTEM FOR ENGINE TMS AOC REDUCTION AND ECS LOSS ELIMINATION

FIELD OF THE DISCLOSURE

The present disclosure generally relates to compression pump assemblies, and more particularly, to a combined pump system for turbine engines.

BACKGROUND OF THE DISCLOSURE

Turbine engines for aircrafts are generally equipped with a means for regulating engine temperatures, such as a thermal management system (TMS), as well as a means for providing adequate ventilation to passengers of the aircraft, such as an environmental control system (ECS). As shown in the prior art embodiments of an engine 10 in FIGS. 1-3, the TMS 12 and the ECS 14 are positioned about a core engine 16 and in line with the exit stream of an associated fan section 18. The TMS 12 includes air-oil coolers (AOCs) that are configured to receive bypass airflow from the fan section 18 and direct the air through heat exchangers positioned within the passages or ducts of the AOCs. Fluid lines carrying oils and other engine fluids are routed through the heat exchangers such that as air passes through the heat exchangers and over the fluid lines, any excess heat within the fluids is dissipated into the airflow. The effectiveness of the heat exchangers is based on the surface area or the overall size of the heat exchangers, as well as the pressure differential across the heat exchangers. More recent engine fan designs tend to decrease this pressure differential, thus requiring an increase in the size of heat exchangers to compensate for the loss of cooling effectiveness. Aside from increasing the overall cost and weight of the engine, providing larger heat exchangers introduces other difficulties associated with the production, installation and maintenance of the larger heat exchangers.

A typical ECS 14 employs compressed air that is selectively obtained from a set of four bleed ports 20, two positioned at a forward portion of the high pressure compressor 22 of the engine 10 and two positioned at an aft portion of the high pressure compressor 22. Based on the mode of operation of the engine 10 and the requirements of the ECS 14, the appropriate combination of bleed ports 20 may be activated to source adequate air to a cabin of the associated aircraft via an arrangement of valves and ducts. The quantity of air sourced by the bleed ports 22, however, is generally discrete and unable to more integrally adapt to all of the conditions of the engine 10 as well as the needs of the ECS 14. More specifically, as each bleed port 22 is either completely on or completely off, the ECS 14 is unable to gradually adjust the amount of air that is sourced to accommodate for intermediary operating conditions. Furthermore, bleeding air to the ECS 14 may result in discrete drops in pressure within the high pressure compressor 22, which may further result in engine surges and inconsistent performance. Such limitations ultimately translate into substantial inefficiencies or losses of the ECS 14 as well as the overall performance of the engine 10.

SUMMARY OF THE DISCLOSURE

In accordance with one aspect of the disclosure, a compression pump for an engine is provided. The pump may include a first impeller operatively coupled to a main shaft of the engine, a first inlet configured to at least partially receive bypass airflow, and a first outlet configured to direct compressed air to a thermal management system.

In a refinement, the pump may further comprise a second impeller operatively coupled to the main shaft, a second inlet configured to at least partially receive bypass airflow, and a second outlet configured to direct compressed air to an environmental control system.

In a related refinement, the first and second impellers may be configured to compress air at different compression rates.

In another refinement, the impeller may be coupled to the main shaft by an engine towershaft.

In a related refinement, the engine towershaft may be coupled to at least one of a low pressure spool and a high pressure spool.

In another refinement, the pump may further comprise an intake manifold that is coupled to the first inlet and configured to at least partially receive bypass airflow exiting a fan section.

In yet another refinement, the thermal management system may include one or more heat exchangers configured to maintain engine fluid temperatures.

In a related refinement, the heat exchangers may be at least partially configured in series.

In accordance with another aspect of the disclosure, a pump system for an engine is provided. The pump system may include a pump operatively coupled to a main shaft of the engine by an engine towershaft, an intake manifold coupled to a first inlet of the pump, and a first discharge manifold coupled to a first outlet of the pump and having one or more heat exchangers.

In a refinement, the pump may include a radial impeller that is rotated by the engine towershaft. The pump may be configured to compress bypass airflow received through the intake manifold and output compressed air through at least the first discharge manifold. The first discharge manifold may be configured to direct compressed air to a thermal management system.

In another refinement, the pump may further include a second discharge manifold that is coupled to a second outlet of the pump and configured to direct compressed air to an environmental control system.

In another refinement, the engine towershaft may be driven by at least one of a low pressure spool and a high pressure spool.

In another refinement, the intake manifold may be configured to intake bypass airflow exiting a fan section.

In yet another refinement, the heat exchangers may be at least partially configured in series.

In accordance with yet another aspect of the disclosure, a pump system for a turbine engine having a main shaft disposed within a core engine is provided. The pump system may include a first impeller, a second impeller, a first discharge manifold and a second discharge manifold. The first impeller may be disposed within a first chamber and operatively coupled to the main shaft. The first chamber may include a first inlet and a first outlet. The second impeller may be disposed within a second chamber and operatively coupled to the main shaft. The second chamber may include a second inlet and a second outlet. The first discharge manifold may be coupled to the first outlet and configured to direct compressed air to a thermal management system. The second discharge manifold may be coupled to the second outlet and configured to direct compressed air to an environmental control system.

In a refinement, the pump system may further include an intake manifold that is coupled to the first and second inlets and configured to at least partially receive bypass airflow exiting a fan section.

In another refinement, the pump system may further include an engine towershaft configured to couple the first and second impellers to the main shaft.

In another refinement, the first and second impellers may be driven by at least one of a low pressure spool and a high pressure spool.

In another refinement, the first and second impellers may be configured to compress air at different compression rates.

In yet another refinement, the first discharge manifold may be configured to direct compressed air to one or more heat exchangers configured to maintain engine fluid temperatures.

These and other aspects of this disclosure will become more readily apparent upon reading the following detailed description when taken in conjunction with the accompanying drawings.

Figure 1:
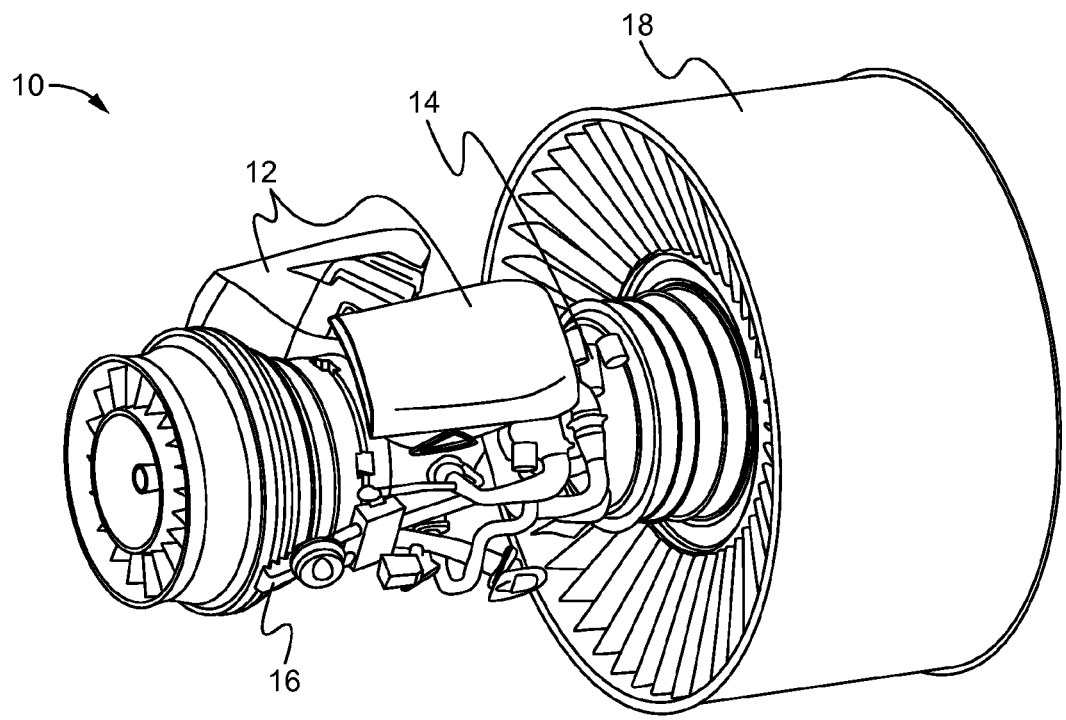
FIG. 1 is a partial perspective view of a prior art turbine engine.
Figure 2:
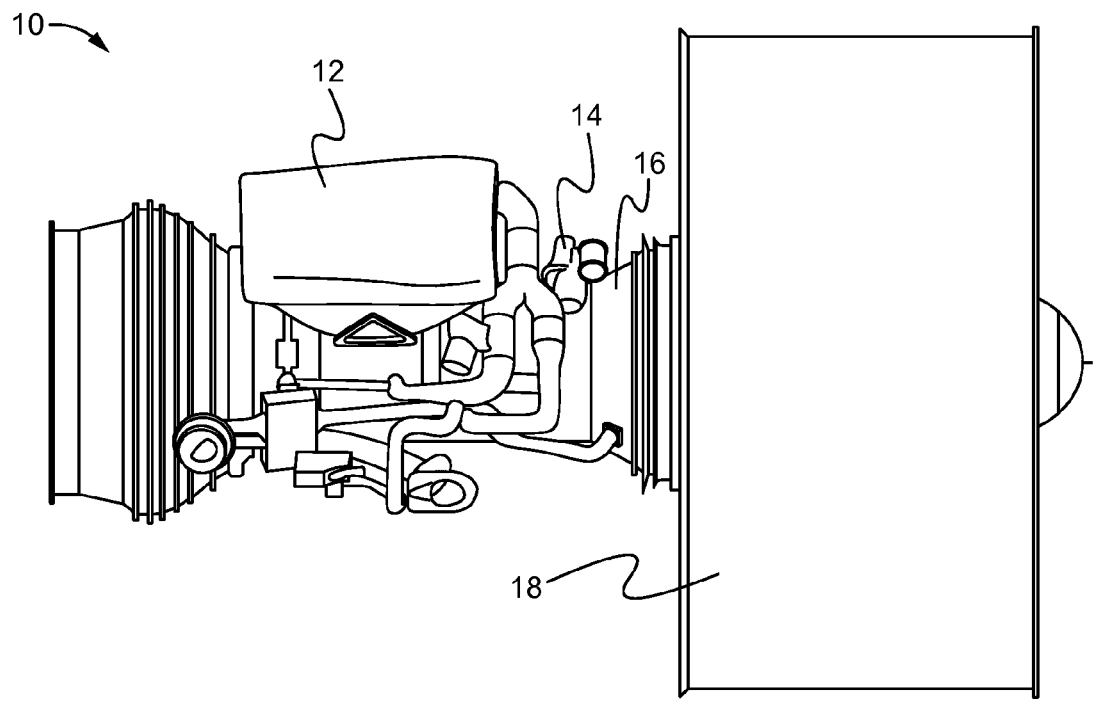
FIG. 2 is a partial side view of a prior art turbine engine.
Figure 3:
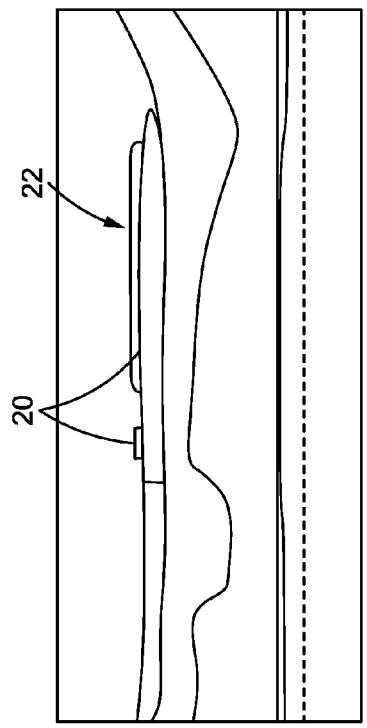
FIG. 3 is a cross-sectional view of a prior art core engine.

While the present disclosure is susceptible to various modifications and alternative constructions, certain illustrative embodiments thereof have been shown in the drawings and will be described below in detail. It should be understood, however, that there is no intention to be limited to the specific forms disclosed, but on the contrary, the intention is to cover all modifications, alternative constructions, and equivalents falling with the spirit and scope of the present disclosure.

DETAILED DESCRIPTION

Figure 4:
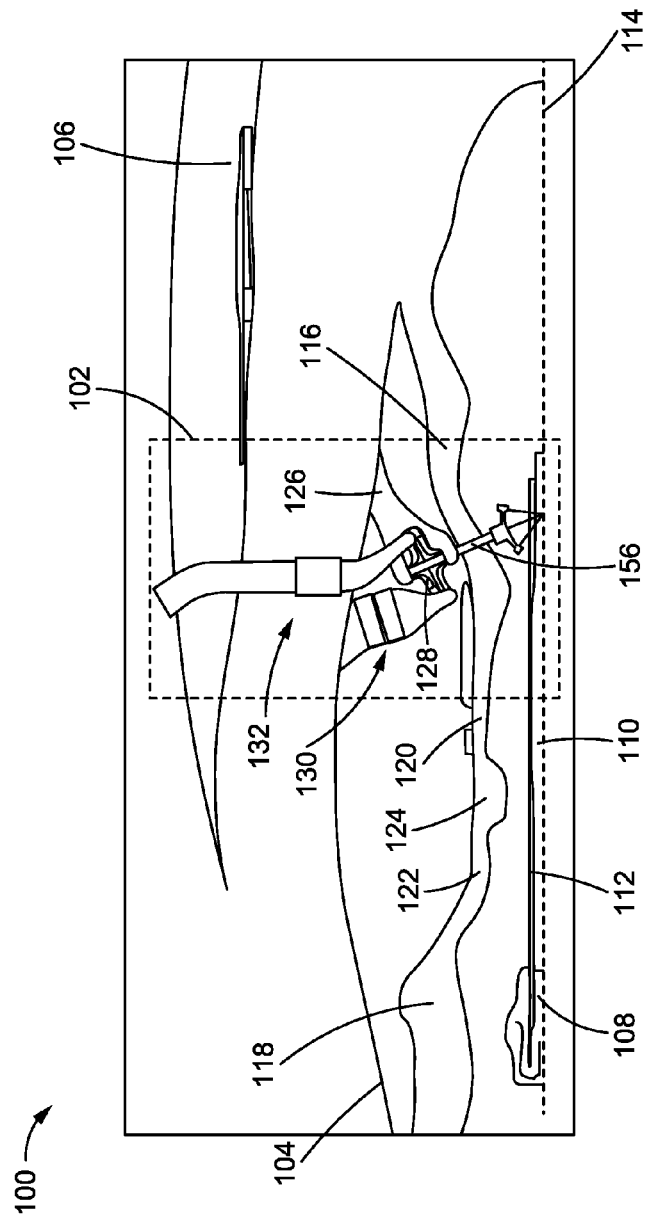
FIG. 4 is a cross-sectional view of one exemplary pump system constructed in accordance with the teachings of the disclosure.

Referring now to FIG. 4, one exemplary embodiment of a gas turbine engine 100 having a combined pump system 102 is provided. It is to be understood that the engine 100 shown is for illustrative purposes only and to present background for some of the various components of a general turbine engine. Other components of a turbine engine unnecessary for an understanding of the present disclosure are not described.

As shown in the cross-sectional view of FIG. 4, the engine 100 may generally include a core engine 104 and a fan section 106. The core engine 104 may house a main shaft 108, for example, including a low pressure spool 110 and a high pressure spool 112, which rotates about a center axis 114 of the engine 100. The low pressure spool 110 may be configured to directly or indirectly operate and rotate the fan section 106, and further, may include a low pressure compressor 116 that is rotatably coupled to a low pressure turbine 118. The high pressure spool 112 may include a high pressure compressor 120 that is rotatably coupled to a high pressure turbine 122. A combustor 124 may be disposed between the high pressure compressor 120 and the high pressure turbine 122. During operation, airflow may enter the fan section 106 where the airflow may be split into a bypass airflow, which bypasses the core engine 104, and a core airflow, which enters the core engine 104 to power the low pressure compressor 116 and the high pressure compressor 120. The core airflow that is compressed by the low pressure compressor 116 and the high pressure compressor 120 may be mixed with fuel in the combustor 124 where the mixture may further be ignited and burned to generate high pressure combustor products. Expansion of the combustor products within the low and high pressure turbines 118, 122 may in turn drive or cause the respective low and high pressure compressors 116, 120 to rotate.

Figure 5:
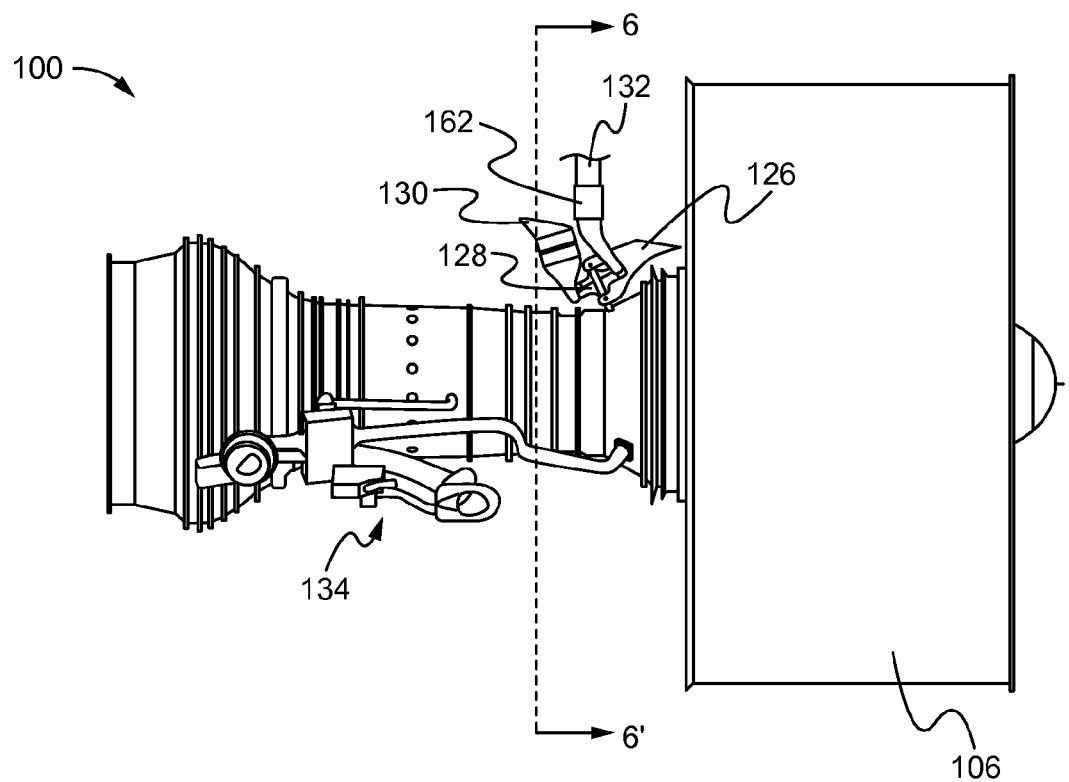
FIG. 5 is a partial side view of another exemplary pump system as fitted on a turbine engine.
Figure 6:
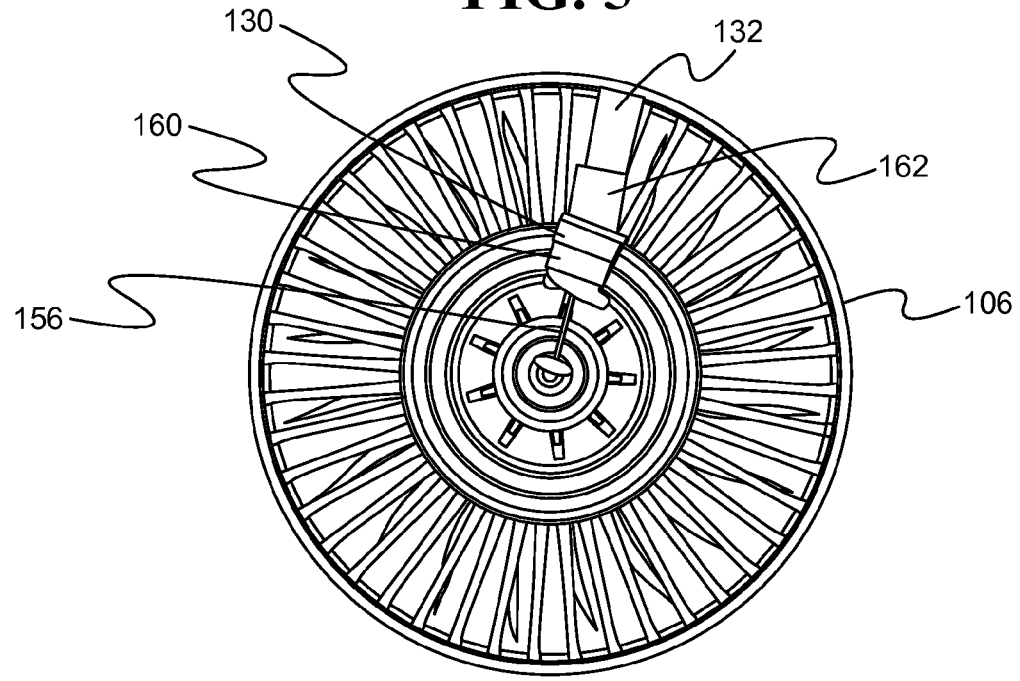
FIG. 6 is a cross-sectional view of the pump assembly of FIG. 5 taken along line 6-6'.

As further illustrated in FIGS. 5 and 6, the pump system 102 may include an intake manifold 126 that is designed to receive bypass airflow immediately exiting the fan section 106 and direct the airflow to a compression pump 128. The pump 128 may be configured to compress the air received and send the compressed air to one or more of a thermal management system (TMS) 130 and an environmental control system (ECS) 132. The TMS 130 may employ the compressed air to cool or reduce the temperature of engine fluids, such as oils, fuels, and the like. The ECS 132 may route the compressed air toward a cabin ventilation system of, for example, the associated aircraft, or the like. As shown, the pump system 102 may be positioned proximate the forward section, for example, toward the fan section 106 of the engine 100 so as to provide the pump system 102 with relatively cooler operating conditions. The pump system 102 may also be arranged to radially extend to one exterior side of the core engine 104 so as to reduce the space that is occupied by the pump system 102 and shared with other components that may be distributed about the core engine 104, such as a combustion control system 134, and the like.

Figure 7:
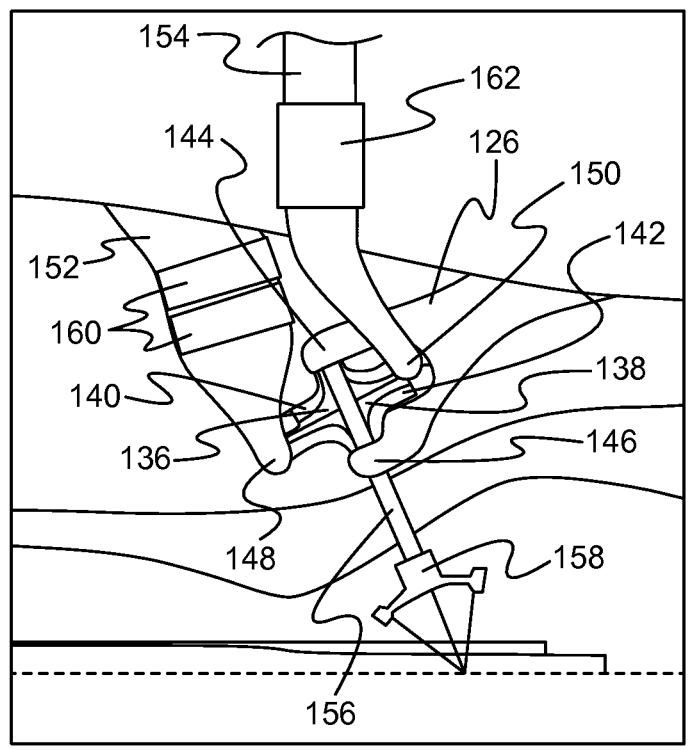
FIG. 7 is another cross-sectional view of the pump system of FIGS. 5 and 6.

Turning to the embodiment of FIG. 7, the pump 128 may be provided with a dual impeller configuration, for example, including a first radial impeller 136 as well as a second radial impeller 138. As shown, the first and second radial impellers 136, 138 may be opposedly oriented and rotatably fixed about a common axis of the pump 128. Moreover, the first and second impellers 136, 138 may be respectively housed and independently sealed within first and second radial chambers 140, 142. Each of the first and second chambers 140, 142 may include an inlet 144, 146 and an outlet 148, 150. As shown in the embodiment of FIG. 7, for example, the inlets 144, 146 of the first and second chambers 140, 142 may be commonly coupled to the intake manifold 126 provided. Additionally, each outlet 148, 150 of the pump 128 may be coupled to a discharge manifold 152, 154 individually associated therewith. For example, the first outlet 148 of the first chamber 140 may be coupled to a first discharge manifold 152, which may be configured to route compressed air to, for example, the TMS 130, or the like. The second outlet 150 of the second chamber 142 may be coupled to a second discharge manifold 154 which may be configured to route compressed air to, for example, the ECS 132, or the like. The first and second impellers 136, 138 may further be sized and/or configured to compress air at different compression rates. In alternative embodiments, the pump system 102 may provide two individual intake manifolds, each individually leading to the inlet 144, 146 of the radial chamber 140, 142 associated therewith. In other alternatives, the outlets 148, 150 of the pump system 102 may be joined into a single discharge manifold, which may direct compressed air to, for example, one or more of the TMS 130 and the ECS 132. In still further alternative modifications, the pump 128 may employ a single impeller configuration housed within a single chamber adapted to source compressed air to, for example, one or more of the TMS 130 and the ECS 132.

Still referring to FIG. 7, the pump system 102 may essentially be operated by the main shaft 108 of the engine 100 through a geared connection such as the engine towershaft 156 shown. More specifically, the towershaft 156 may be coupled to the main shaft 108 through a gear assembly 158 such that rotation of the main shaft 108 causes rotation of the towershaft 156. Furthermore, rotation of the towershaft 156 may cause rotation of the impellers 136, 138 of the pump 128 fixed thereto so as to compress air within the respective chambers 140, 142 and direct the compressed air to the TMS 130, the ECS 132, or the like. In further modifications, the towershaft 156 may optionally be coupled to either the low pressure spool 110 or the high pressure spool 112 of the core engine 104 to achieve different results. For example, driving the pump 128 via the low pressure spool 110 may improve the efficiency of the high pressure compressor 120 while reducing exhaust gas temperatures (EGT). Driving the pump 128 via the high pressure spool 112, for example, may produce more favorable drive speeds and reduce engine excursions.

During operation of the pump system 102 of FIG. 7, bypass air that is compressed within the first chamber 140 may be directed through the first discharge manifold 152 and toward the TMS 130 disposed therein. The TMS 130 may include one or more heat exchangers 160 that are configured with air-oil coolers (AOCs) to reduce or maintain the temperature of oils and other vital engine fluids. More specifically, fluid lines carrying oils and other engine fluids of the AOCs may be routed through the heat exchangers 160 such that as compressed air passes through the heat exchangers 160 and over the fluid lines, any excess heat within the fluids is dissipated into the airflow. Accordingly, the heat exchangers 160 may be positioned across the path of the compressed air traveling through the discharge manifold 152 and arranged at least partially in series with one another within the discharge manifold 152 as shown.

Additionally, during operation of the pump system 102 of FIG. 7, bypass air that is compressed within the second chamber 142 may be directed through the second discharge manifold 154 which may further lead to the ECS 132 of an associated aircraft, or the like. Aside from supplying air to the passenger cabin, the ECS 132 may also serve to provide appropriate thermal control as well as cabin pressurization. Moreover, the ECS 132 may route air that is compressed by the pump 128, for example, through the pylon of the associated aircraft and toward a pre-cooler or a cabin ventilation system where the air is appropriately filtered, processed, distributed, and the like. In order to maintain consistent airflow and pressure between the pump system 102 and the cabin, the ECS 132 may include a set of check valves 162, or the like, across the second discharge manifold 154 so as to prevent backflow.

The combined pump system disclosed herein may be used with a wide range of turbine engines typically used for the propulsion of vehicles, such as aircrafts, and the like. By employing the pump system to increase the pressure differential within the discharge manifold and across the heat exchangers of a TMS, the required size of the heat exchangers may be reduced while maintaining adequate and efficient engine cooling. Also, as the air sourced to the ECS is controlled through the towershaft and the main shaft of the engine rather than through bleed ports, ventilation of the cabin may be more consistently maintained under most engine operating conditions. Furthermore, by sourcing compressed air from bypass airflow rather than from the high pressure compressor of the core engine, surges and other operational inconsistencies may be reduced.

While only certain embodiments have been set forth, alternatives and modifications will be apparent from the above description to those skilled in the art. These and other alternatives are considered equivalents and within the spirit and scope of this disclosure.

What is claimed is:

1. A compression pump for an engine, comprising:
   a first radial pump impeller operatively coupled to a main shaft of the engine, the first radial pump impeller rotatably fixed about a common axis of the compression pump, the common axis of the compression pump nonparallel to a center axis of the engine;
   a first inlet configured to at least partially receive bypass airflow; a first outlet configured to direct compressed air to a thermal management system;
   wherein the first radial pump impeller is coupled to the main shaft by an engine towershaft and wherein the engine towershaft rotatable about a longitudinal axis; and
   wherein the compression pump is located within an engine core nacelle of the engine.

2. The compression pump of claim 1 further comprising a second pump impeller operatively coupled to the main shaft, a second inlet configured to at least partially receive bypass airflow, and a second outlet configured to direct compressed air to an environmental control system.

3. The compression pump of claim 2, wherein the first pump impeller and the second pump impellers are configured to compress air at different compression rates.

4. The compression pump of claim 1, wherein the first pump impeller is coupled to the main shaft by an engine towershaft.

5. The compression pump of claim 4, wherein the engine towershaft is coupled to at least one of a low pressure spool and a high pressure spool.

6. The compression pump of claim 1 further comprising an intake manifold that is coupled to the first inlet and configured to at least partially receive bypass airflow exiting a fan section.

7. The compression pump of claim 1, wherein the thermal management system includes one or more heat exchangers configured to maintain engine fluid temperatures.

8. The compression pump of claim 7, wherein the heat exchangers are at least partially configured in series.

9. A pump system for an engine, comprising:
   a pump operatively coupled to a main shaft of the engine by an engine towershaft, the engine towershaft is rotatable about a longitudinal axis and radially extending to one exterior side of the engine;
   a radial pump impeller rotatably fixed about the engine towershaft;
   an intake manifold coupled to a first inlet of the pump; and
   a first discharge manifold coupled to a first outlet of the pump and having one or more heat exchangers;
   wherein an axis of rotation of the radial pump impeller is nonparallel to a central axis of the engine and
   wherein the pump being configured to compress bypass airflow received through the intake manifold and output compressed air through at least the first discharge manifold.

10. The pump system of claim 9, wherein the pump includes one or more radial pump impellers that are rotated by the engine towershaft, the pump being configured to compress bypass airflow received through the intake manifold and output compressed air through at least the first discharge manifold, the first discharge manifold being configured to direct compressed air to a thermal management system.

11. The pump system of claim 9 further comprising a second discharge manifold that is coupled to a second outlet of the pump and configured to direct compressed air to an environmental control system.

12. The pump system of claim 9, wherein the engine towershaft is driven by at least one of a low pressure spool and a high pressure spool.

13. The pump system of claim 9, wherein the intake manifold is configured to intake bypass airflow exiting a fan section.

14. The pump system of claim 9, wherein the heat exchangers are at least partially configured in series.

15. A pump system for a turbine engine having a main shaft disposed within a core engine, the pump system comprising:
 a first impeller disposed within a first chamber and operatively coupled to the main shaft, the first chamber having a first inlet and a first outlet, the first pump impeller rotatably fixed about a common axis of the pump system the common axis radially extending to one exterior side of the engine;
 a second pump impeller disposed within a second chamber and operatively coupled to the main shaft, the second chamber having a second inlet and a second outlet, the second pump impeller rotatably fixed about the common axis of the pump system, the common axis radially extending to one exterior side of a core engine;
 outlet a first discharge manifold coupled to the first outlet and configured to direct compressed air to a thermal management system; and a second discharge manifold coupled to the second outlet and configured to direct compressed air to an environmental control system;
 wherein the common axis of the pump system is nonparallel to the main shaft;
 wherein an intake manifold is coupled to the first and second inlets and configured to at least partially receive bypass airflow exiting a fan section; and
 wherein an engine towershaft is configured to couple the first and second pump impellers to the main shaft.

16. The pump system of claim 15 further comprising an intake manifold that is coupled to the first and second inlets and configured to at least partially receive bypass airflow exiting a fan section.

17. The pump system of claim 15 further comprising an engine towershaft configured to couple the first and second pump impellers to the main shaft.

18. The pump system of claim 15, wherein the first pump impeller and the second pump impeller are driven by at least one of a low pressure spool and a high pressure spool.

19. The pump system of claim 15, wherein the first pump impeller and the second pump impellers are configured to compress air at different compression rates.

20. The pump system of claim 15, wherein the first discharge manifold is configured to direct compressed air to one or more heat exchangers configured to maintain engine fluid temperatures.

* * * * *